United States Patent [19]

Hatch

[11] 3,957,698
[45] May 18, 1976

[54] THERMALLY REVERSIBLE, AMPHOTERIC ION EXCHANGE RESINS CONSISTING OF CROSSLINKED MICROBEADS EMBEDDED IN CROSSLINKED MATRIX OF OPPOSITE EXCHANGE GROUP TYPE

[75] Inventor: Melvin J. Hatch, Socorro, N. Mex.

[73] Assignee: The Dow Chemical Company, Midland, Mich.

[22] Filed: Nov. 5, 1974

[21] Appl. No.: 521,114

[52] U.S. Cl. .......................... 260/2.1 R; 260/2.1 M; 260/2.2 R; 210/37 R; 210/38 R
[51] Int. Cl.² ........................................ C08F 257/02
[58] Field of Search ........... 260/2.1 R, 2.1 E, 2.2 R, 260/2.1 M; 210/37, 38

[56] References Cited
UNITED STATES PATENTS

| | | | |
|---|---|---|---|
| 3,041,292 | 6/1972 | Hatch | 260/2.1 E |
| 3,078,140 | 2/1963 | Hatch | 260/2.1 |
| 3,332,890 | 7/1967 | Hatch | 260/2.1 |
| 3,645,922 | 2/1972 | Weiss et al. | 260/2.1 E |
| 3,875,085 | 4/1975 | Bolto | 260/2.2 R |

Primary Examiner—Joseph L. Schofer
Assistant Examiner—Peter F. Kulkosky
Attorney, Agent, or Firm—David B. Kellom

[57] ABSTRACT

Thermally reversible, amphoteric microbead matrix ion exchange resins of micron size particles of crosslinked, weak acid cation or weak base anion exchange resin embedded in a matrix of a weak ion exchange resin of opposite form are prepared by suspending micron size particles of a weak ion exchange resin in a mixture of monomers which can be converted to a crosslinked matrix polymer, polymerizing the monomers, and then converting the microbead-matrix resin into active ion exchange form with a particle size of about 0.074–4.00 mm. Preferably the resin has microbeads of crosslinked polyacrylic acid embedded in a matrix of polymerized vinylbenzyl chloride - divinylbenzene aminated with dimethyl amine. These amphoteric resins absorb salts from water in a thermally reversible manner with improved resin capacities and kinetics. They have particular utility in the desalination of brackish waters.

18 Claims, 1 Drawing Figure

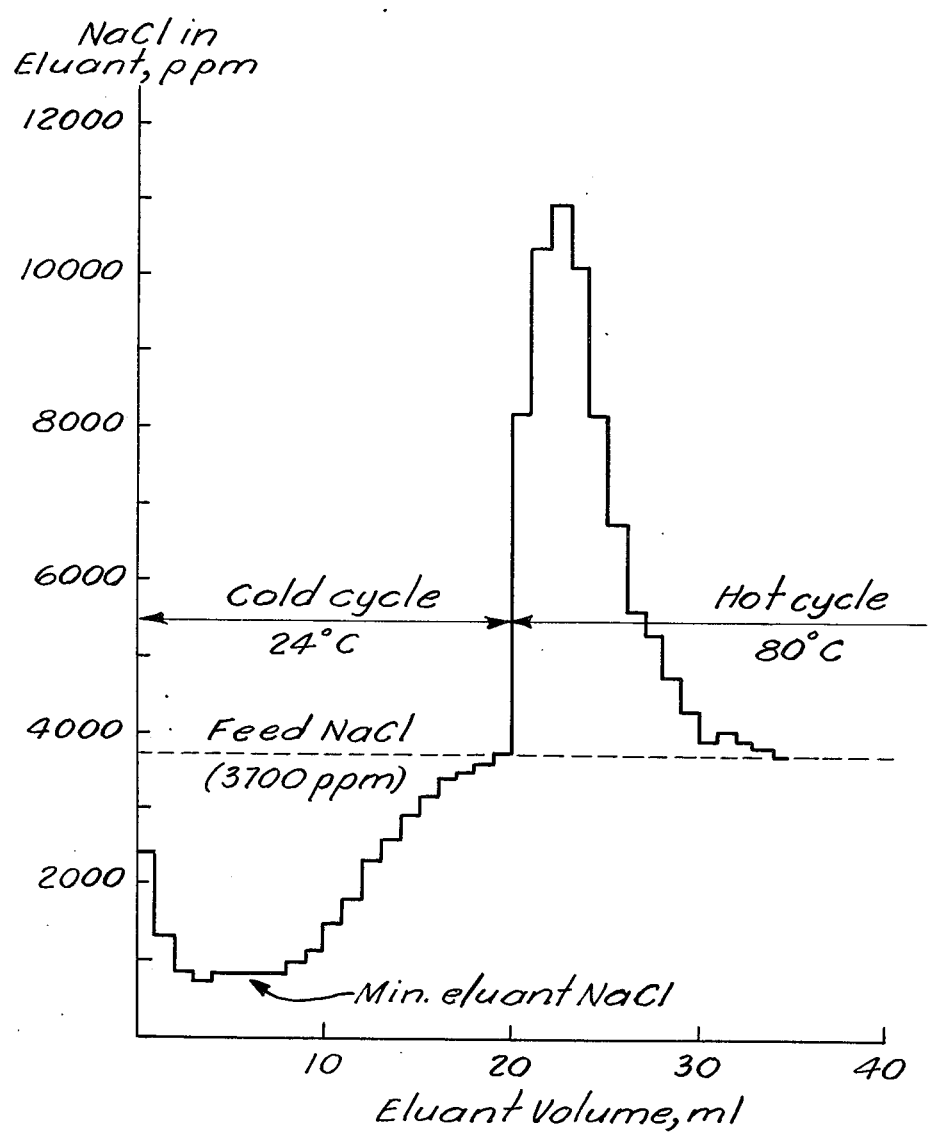

THERMALLY REVERSIBLE, AMPHOTERIC ION EXCHANGE RESINS CONSISTING OF CROSSLINKED MICROBEADS EMBEDDED IN CROSSLINKED MATRIX OF OPPOSITE EXCHANGE GROUP TYPE

BACKGROUND

In U.S. Pat. No. 3,645,922, Weiss e.a. describes a composite ion exchange resin of particulate acid and base ion exchange materials dispersed in a homogeneous matrix of a water-insoluble, crosslinked, hydrophilic polymer such poly (vinyl alcohol). This composite resin is particularly suitable for use in the demineralization of salt solutions by the "Sirotherm" process. In this Australian process for the partial demineralization of brackish water, a mixed bed of weak acid and weak base resins is used to remove dissolved salts from the brackish water. The weak acid and weak base resins are so chosen that the electrolyte adsorption characteristics are thermally reversible. For example, at 25°C the mixed bed will adsorb salt from the water, but when the temperature is raised to 85°C, the equilibrium shown in Eq. 1 will be reversed to release the adsorbed salt.

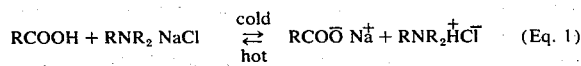
$$RCOOH + RNR_2 \, NaCl \underset{hot}{\overset{cold}{\rightleftarrows}} RCOO^- \, Na^+ + RNR_2\overset{+}{H}Cl^- \quad (Eq. \ 1)$$

Thus a resin bed saturated with salt at ambient temperature, can be thermally regenerated by washing with hot water and recycled.

Extensive work has been done on this process. Initial pilot plant studies have been reported by Battaerd e.a., Desalination, 12, 217–237 (1973). It has been recognized that since a proton must be transferred from one weakly ionized particle to another, small particles are essential for acceptable absorption and regeneration kinetics. Thus Battaerd e.a. U.S. Pat. Nos. 3,619,394 and 3,716,481 describe quasispherical triallylamine polymers having a mean diameter of 0.5–10 microns for use in the Sirotherm process.

Since the thermally reversible resin is the key component in this process, improved resin structures are highly desirable.

Another approach to composite ion exchange resin particles is described in Hatch U.S. Pat. Nos. 3,041,292, 3,205,184 and 3,332,890 where an essentially linear polymer is formed within the interstices of a conventional ion exchange resin by absorbing and polymerizing a suitable monomer in situ. Thus ar-vinylbenzyltrimethylammonium hydroxide was polymerized within a sulfonated styrene-divinylbenzene resin to give a composite "snake-cage" resin effective in absorbing neutral salts from aqueous solution. These composite resins are particularly effective in separating solutes by the ion retardation process of Hatch U.S. Pat. No. 3,078,140. Extension of this concept to the preparation of weak acid-weak base snake-cage resins gave thermally reversible resins with fast kinetics but unacceptably low salt capacities.

STATEMENT OF THE INVENTION

Novel, thermally reversible, amphoteric ion exchange resins suitable for the desalination of brackish waters have now been prepared by incorporating micron size particles of weak acid cation exchange resin into a crosslinked vinylaromatic resin matrix and thereafter converting the resin matrix into a weak base ion exchange resin.

Alternately microbead particles of a weak base resin can be incorporated in a weak acid matrix. Preferably these microbead-matrix resins are prepared by incorporating microbeads of polymerized acrylic or methacrylic acid crosslinked with divinylbenzene in a vinylbenzyl chloride-divinylbenzene matrix and thereafter aminating the chloromethyl polymer with a secondary amine such as dimethylamine. This gives an amphoteric, microbead-matrix resin incorporating an intimate mixture of weak base and weak acid groups within a single resin particle. These resins have improved proton diffusion and salt sorption kinetics. Advantageously, the microbeads should have a particle diameter of about 0.1–10 microns and the matrix resin a particle size of about 200–5 mesh (0.074–4.00 mm).

These amphoteric, microbead-matrix resins have suitable physical properties for use in conventional ion exchange equipment coupled with thermal reversibility and improved salt sorption kinetics as required for practical utilization in the demineralization of aqueous process streams including brackish water and raw sugar solutions by the Sirotherm process.

GENERAL DESCRIPTION — RESIN PREPARATION

The amphoteric microbead-matrix resins are prepared by a sequence of reactions involving:
A. Preparing a crosslinked weak acid or weak base ion exchange resin in microbead form with an average particle size of about 0.1–10 microns and about 0.5–10 percent crosslinking;
B. Suspending the weak acid or weak base microbead particles in a liquid mixture of monomers which can be converted to a crosslinked matrix polymer of opposite ion exchage type;
C. Polymerizing the liquid monomer mixture to form a matrix resin having the microbead particles embedded therein; and
D. Converting as necessary the microbead-matrix resin into active ion exchange form with a particle size of about 200–5 mesh (0.074–400 mm).

The microbead and matrix resins can be formed directly in the desired size, or as larger particles which can be subsequently converted to proper size. Also the component microbead and matrix resins can be converted to the desired weak base or weak acid form by any of a variety of reactions known for the synthesis of ion exchange resins.

1. Preparation of Crosslinked Microbead Resins

The technology for preparing weak acid or weak base ion exchange resins by suspension polymerization is well established as shown by D'Alelio U.S. Pat. No. 2,340,111, Bodamer U.S. Pat. No. 2,597,437, British Pat. No. 719,330 or French Pat. No. 1,205,505, for example. The most common commercial weak acid resins are prepared by copolymerization of acrylic or methacrylic acid with divinylbenzene. For use herein, resins in microbead size of about 0.1–10 micron particle diameter are required. If the microbeads are much larger, kinetics of exchange and regeneration become too slow for practical use. Further the degree of crosslinking is also important, ranging preferably from about 0.5–10 wt % based on initial monomers.

In practice weak acid microbeads are formed by polymerization of an ethylenically unsaturated carboxylic acid with about 0.5–10 wt % of a polyvinyl crosslinker. Examples of useful ethylenically unsaturated carboxylic acid monomers are acrylic acid, methacrylic acid, maleic acid, itaconic acid, crotonic acid and vinyl benzoic acid. Alternately, derivatives of such monomers such as an ester, anhydride, or nitrile which can be converted into the desired weak acid functionality by hydrolysis can be used. Typical of such derivatives are methylacrylate, maleic anhydride and acrylonitrile. Suitable polyvinyl crosslinkers include: divinylbenzene, divinylpyridine, divinyltoluene, divinylnaphthalene, diallyl phthalate, ethylene glycol diacrylate, ethylene glycol dimethacrylate, sulfone, polyvinyl or polyallyl glycol ethers, diallyl maleate, diallyl succinate, and N,N'-methylenediacrylamide.

Particularly suitable are microbead resins prepared by polymerization of acrylic or methacrylic acid with 0.5–10 wt. % divinylbenzene as crosslinking monomer using a liquid diluent such as a saturated low molecular weight liquid hydrocarbon like heptane, isooctane or mineral spirits. In such systems the interfacial tension on the insoluble, polymer-rich phase causes the separation of the polymer as a mass of microspheres; Cf. Kun & Kunin, *J. Poly. Sc.* A-1, 6, 2689 (1968). The result in a dispersion of very small particles—"microbeads" of the crosslinked polymer. Sizes typically will be a few microns in diameter. These microbeads can be dried readily, and if some aggregation occurs, light grinding readily produces the desired small particles.

Alternately, suitable microbead resins can be prepared by suspension or emulsion polymerization using suitable dispersing liquids which are nonsolvents for the suspended or emulsified monomers. For example, acrylate or methacrylate monomers with divinylbenzene can be dispersed in an aqueous medium and polymerized using a water insoluble catalyst and suspending agent. The resulting micron sized particles can be recovered and hydrolyzed before or after incorporation in the microbead-matrix resin.

Also conventional weak acid ion exchange resins can be ground as suggested, for example, by Levendusky U.S. Pat. No. 3,409,566, and screened to give weak acid microbead resin suitable for incorporation in the matrix resin.

2. Preparation of Microbead-Matrix Resin

Essential to the present invention is the incorporation of the weak acid or base microbeads into a matrix resin of opposite type to give a composite amphoteric resin of conventional ion exchange resin particle size, e.g., about 200–5 mesh (0.074–4.00 mm). This is achieved by suspending the microbead particles in a liquid which can be polymerized into a crosslinked matrix polymer which is, or can be easily converted into, a weak base resin. If carried out in bulk, the crosslinked matrix polymer must be ground or broken up into appropriate particle size for a column or other ion exchange apparatus. In some instances, the microbead-matrix resin can itself be prepared by an appropriate suspension polymerization process yielding directly composite resin beads of desired size. Advantageously such a process can use the inert diluent technology of Mindick and Svarz U.S. Pat. No. 3,549,562 and Corte and Meyer U.S. Pat. No. 3,637,535 to obtain a macroporous matrix resin.

In practice the weak base matrix resin is conveniently a crosslinked polyvinylaromatic resin since such are readily converted into ion exchange resins by known methods. Particularly useful as a matrix resin is a vinylbenzyl chloride-divinylbenzene copolymer such as described by Clarke e.a. U.S. Pat. No. 2,780,604. Alternately styrene-divinylbenzene copolymers can be used and converted into weak based resins by chloromethylation and amination as described in McBurney U.S. Pat. Nos. 2,591,573 and 2,591,574, Bauman and McMaster U.S. Pat. No. 2,614,009, and McMaster U.S. Pat. No. 2,616,877. Also other monovinyl aromatic monomers can be used including ethylstyrene, vinyltoluene, chlorostyrene, etc. While divinylbenzene is normally used as the crosslinking monomer, other conventional polyvinyl monomers can be used as appropriate for a desired matrix resin.

The degree of matrix resin crosslinking is an important factor in the performance of the final composite resin. A relatively low percent divinylbenzene crosslinking of about 0.5–5.0 wt. %, preferably about 1.0–2.5 wt. %, is desired for optimum performance. Additional crosslinking is normally obtained in the subsequent amination to form the weak base anion exchange group.

To incorporate the microbead resin in the matrix, the finely divided weak acid microbeads are added to a liquid solution of the vinylaromatic monomers along with a suitable catalyst and, if necessary to fluidize the mixture, an inert liquid diluent such as toluene, isooctane, or other liquid hydrocarbon. For the desalination process, a resin having a greater weak acid than weak base capacity is desireable. So the relative proportions of the weak acid microbeads and vinylaromatic monomers are adjusted accordingly, normally with a ratio of about 1.0–2.0 meq weak acid resin/1.0 meq vinylaromatic resin. Then the mixture is polymerized to give an intermediate weak acid microbead-matrix resin. Such resins typically have a weak acid capacity of about 0.2–5.0 meq/g dry resin. They can be converted by grinding, if necessary, into the desired 200–5 mesh particle size.

3. Amphoteric Microbead-Matrix Resins

Generally a final chemical reaction will be required to convert the intermediate microbead-matrix resin into final amphoteric form. Where the matrix resin is prepared from vinylbenzyl chloride, or alternately a similar chloromethyl microbead-matrix resin is prepared by chloromethylation of a vinylaromatic resin, weak base anion exchange groups are readily introduced by amination with a primary or secondary amine. Although $C_1-C_{10}$ alkyl or hydroxyalkyl amines such as dimethylamine, methylethanolamine t-butylamine and methylisooctylamine are preferred, a wide variety of amines including such polyalkylenepolyamines as ethylenediamine, triethylenetetramine and hexamethylenetetramine can be used. As in the preparation of conventional weak base resins, an excess of amine is used to insure complete amination and to control crosslinking through formation of bridging amine or quaternary ammonium groups.

Other modes for introducing the desired functionality including hydrolysis, reduction of nitro groups, etc., can be used as appropriate. Also it is evident that the functionality of the microbead-matrix resin can be reversed, for example, by embedding microbeads of vinylbenzyl chloride-divinylbenzene in a polyacrylic acid-divinylbenzene matrix and thereafter aminating.

THERMALLY REVERSIBLE DEMINERALIZATION

The amphoteric microbead-matrix resin, sometimes referred to as a sand-in-the-head resin, is preconditioned to the pH of the aqueous solution, normally in the range of about pH 6–8, by use of appropriate buffer solutions, etc. While the operating pH can be between about 5 and 9, best results are obtained at about pH 6–8. The resin is contacted alternately with the solution which contains dissolved salts at two different temperatures. The salts will be adsorbed more strongly during the lower temperature part of the operating cycle, and less strongly during the higher. As a result, a salt depleted stream (product) and salt enriched stream (waste) will be produced. Column operation will be advantageous, as will be the use of as large temperature differentials as feasible, limited only by heat sources economically available and the thermal stability of the microbead-matrix resin. It is possible that in some cases the salt enriched stream will be the desired product, but in general, the object will be to remove undesired salts from a portion of the solution being processed. It also is possible to use solutions for feed, and for regeneration, which are not at the same concentration of salt, i.e., in some cases use of part of the salt depleted stream to finish the regeneration during the higher temperature part of the cycle might be advantageous.

The Figure is a performance curve demonstrating the thermally reversible desalination of an aqueous solution containing 3500 ppm NaCl fed to a polyacrylic acid (PAA) microbead-polyvinylbenzyldimethylamine (PVBDMA) matrix resin (Resin No. 1C) at temperatures alternating abruptly between 25° and 80°C with a rapid flow rate of about 18 ml/cm$^2$/min and a very shallow bed height of 2.9 cm. Although there was some deterioration of the elution curve when the feed rate was increased to about 100 ml/cm$^2$/min, the results confirmed the extremely effective exchange kinetics of this resin. It can be effectively used to treat brackish water containing about 500–5000 ppm dissolved solids including alkaline-earth salts responsible for undesired hardness.

The following examples illustrate further the present invention. Unless otherwise specificied, all parts and percentages are by weight. All monomers and other materials were commercial products used without further purification. Analyses and resin capacities are determined by standard methods.

EXAMPLE 1

2.5x PAA — 1.5x AmPVBC Microbead-Matrix Resin

A 2.5% DVB crosslinked polyacrylic acid microbead — 1.5% DVB crosslinked aminated polyvinylbenzyl chloride matrix resin was made and characterized as follows:

A. The following materials were added to a polymerization tube:
  5.26 pts acrylic acid (AA)
  0.10 pt azobisisobutyronitrile (AIBN)
  0.10 pt benzoyl peroxide
  0.26 pt 55% divinylbenzene (DVB)
  10.24 pts n-heptane.

The tube was flushed with nitrogen, sealed, and heated for 2 hours in a bath at 65°C, then for 1 hour in a bath at 80°C. The very fine particulate polymer was recovered and air dried. The bead size of the particles was determined to be about 2–5 microns by microscopic examination. The DVB crosslink density was 2.5 wt. %.

B. To a mixture of 0.15 pt azobisisobutyronitrile (AIBN), 3.4 pts (20 meq.) vinylbenzyl chloride (VBC) and 0.094 pt 55% DVB was added 1.56 pts (20 meq.) of the 2.5 x-PAA microbead resin of Example 1A. The tube was flushed with nitrogen, sealed, and after thorough blending of the microbead resin polymerized by heating for 1 hour each at 50°, 65° and 80°C. The resulting solid polymer was recovered, 4.61 pts, broken up mechanically and screened to obtain particles of about 40–200 mesh. The DVB crosslink density of the PVBC matrix resin was 1.5 wt %.

C. To 2.00 pts of the screened 2.5 x-PAA-1.5 X-PVBC resin of Example 1B was added a solution of 10 parts of 28% aqueous dimethylamine diluted with 8 parts of dimethylsulfoxide. After standing overnight at room temperature, the mixture was heated at 85°C for 2 hours. To insure complete amination, the resin was heated for another 2 hours at 85°C with a similar amount of fresh dimethylamine solution. The product microbead-matrix resin was recovered and washed with acetone and water. The final weight of water wet resin was 4.48 parts.

D. Demineralization capacities of the microbead-matrix resins were determined using a shallow resin bed and standard procedures. The test apparatus was a water jacketed 1.0 cm i.d. glass resin column, fitted with a similar preheater section filled with glass beads, and normally filled with about 5 ml of test resin giving a bed height of about 5 cm. Prior to evaluation, each resin was pre-equilibrated by washing with 2 N ammonium acetate buffered at pH 7 and then successively with hot (80°C) 1 N and 0.063 N NaCl. Then the capacity was determined using 0.063 N NaCl (3680 ppm) with alternate cold (room temperature, ca. 24°C) and hot (80°C) cycles at a flow rate of about 0.5 ml/minute. High performance resins were further evaluated at a very rapid flow rate of about 3.0 ml/minute corresponding to an operating rate of about 100 ml/cm$^2$/min (25.4 gal/ft$^2$/min).

The sample of the resin of Example 1C resin was pre-equilibrated by washing with 130 ml of 2 N ammonium acetate (pH 7) overnight at room temperature. Then 100 ml of 1.0 N NaCl and 250 ml of 0.063 N NaCl were run through the column at 80°C in 20 and 120 minutes, respectively. The thermally reversible capacity was then determined using alternate cycles of cold and hot 0.063 N NaCl.

Flow rates (ml/min.): Cold — 0.59; Hot — 0.47
Capacity:  1st Cold — 0.203 meq/ml resin
          2nd Cold — 0.202 meq/ml resin
          Hot      — 0.218 meq/ml resin
The maximum demineralization calculated by the formula: $\dfrac{\text{Feed NaCl} - \text{Minimum Eluant NaCl}}{\text{Feed NaCl}} \times 100$
was 1st Cold cycle — 79%, 2nd Cold — 78%.

The FIGURE shows the first cycle elution curve for this resin. While some deterioration of the elution curve was observed at a higher flow rate of about 1 bed volume/minute, the results were remarkably good for such an operation and demonstrate effective and rapid exchange kinetics of this resin, results entirely suitable for the practical desalination of brackish water.

Assuming an operating flow rate of about 400 l/m²/min (10 gpm/ft²) and a bed depth of 1.5 m, a unit containing the resin of Example 1C could process 5.9 bed volumes of brackish water with 3500 ppm salt at 25°C, and be regenerated with 3.5 bed volumes of brackish water at 80°C while giving as eluant 4.5 bed volumes of product water (1000 ppm salt), 1.4 bed volumes recycled brackish water, and 3.5 bed volumes of concentrated waste (6800 ppm salt).

E. A similar evaluation using an aqueous calcium chloride solution demonstrated the ability of the resin to soften hard water in a process using thermal regeneration.

EXAMPLE 2

6.9x PMAA — 1.5x AmPVBC Microbead-Matrix Resin

A 6.9% DVB crosslinked polymethacrylic acid microbead — 1.5% DVB crosslinked aminated polyvinylbenzyl chloride matrix resin was prepared as follows:

A. The following materials were added to a polymerization tube:
0.20 part AIBN
5.25 parts MAA (59.0 meq.)
0.93 part 55% DVB
10.24 parts n-heptane.

The tube was flushed with $N_2$, sealed and heated for 1 hour each at bath temperatures of 50°, 65° and 80°C. The polymer was removed from its tube, washed with hexane, and air dried overnight. The air dried polymer, 5.9 parts, contained only 4.9% volatiles when heated at 90°C and had a bead size of about 3–6 microns.

B. A 1.56 part sample of the microbead resin 2A containing 15.3 mmoles polymerized methacrylic acid, was added to a mixture of 0.15 part AIBN, 2.70 parts (16.1 meq), 99.6% VBC, and 0.07 part 55% DVB. Also 1.0 part toluene was added to increase the fluidity of the slurry. The tube was flushed with nitrogen, sealed, held at room temperature for 2 days and then heated at 50°, 65° and 80°C for 1 hour each. The solid polymer, 4.25 parts, was recovered and ground to about 200–5 mesh.

C. To 2.00 parts of the ground 6.5x PMAA — 1.5x PVBC resin was added 8 parts of dimethylsulfoxide, 3 parts water and 7.0 parts 40% aqueous dimethylamine. After heating 2 hours at 90°C, the aminated product was recovered and thoroughly washed; wet weight 3.90 parts.

D. A sample of Resin 2C was pre-equilibrated as described in Example 1 and the thermally reversible capacity determined using a column flow rate of 0.47 ml/min.

| Capacity: | 1st Cold | — 0.102 meq/ml |
|---|---|---|
| | 2nd Cold | — 0.104 meq/ml |
| | Hot | — 0.112 meq/ml |
| Max. demineralization: 73% | | |

EXAMPLE 3

4.8x PMAA — 2.0x AmCMPS MIcrobead-Matrix Resin

A 4.8% DVB crosslinked polymethacrylic acid microbead — 2.0% DVB crosslinked aminated chloromethylated polystyrene matrix resin was prepared as follows:

A. The 4.8x PMAA microbead resin was prepared as described in Example 2A using an appropriate amount of 55% DVB.

B. A slurry of 1.56 parts finely divided microbead resin 3A and 0.1 part AIBN in a mixture of 1.62 parts of styrene and 0.064 part 55% DVB was polymerized by heating in a sealed tube for 1 hour each at 50°, 65° and 80°C.

C. The matrix polymer 3B was broken up mechanically and screened with a 40 mesh screen. Then 2.8 parts were added to a solution of 3.75 parts anhydrous $ZnCl_2$ in about 60 parts chloromethyl methyl ether and heated for 1.5 hours at about 55°C and 3 hours at about 75°C. The chloromethylated resin was recovered, washed successively with acetone, water, methanol and water, and then air dried to give 4.71 parts of chloromethylated resin.

D. A 2.0 part sample of chloromethylated resin 3C was aminated at 85°–90°C with a solution of 7.0 parts 40% aqueous dimethylamine, 3.0 parts water and 8.0 parts dimethylsulfoxide. The wet resin (4.45 parts), although not as physically strong as a similar resin made using vinylbenzyl chloride, was evaluated for thermally reversible NaCl capacity after equilibration with buffered ammonium acetate and NaCl. The following results were obtained using a flow rate of 0.56 and 0.55 ml/min for the cold and hot cycles for a 3.4 ml resin bed:

| Capacity: | 1st Cold | — 0.066 meq/ml |
|---|---|---|
| | 2nd Cold | — 0.066 meq/ml |
| | Hot | — 0.077 meq/ml |
| Max. demineralization: 56% | | |

EXAMPLE 4

2.0x AmPVBC — 7.9x — PMAA Microbead-Matrix Resin

A resin containing 2.0% DVB crosslinked aminated polyvinylbenzyl chloride microbeads embedded in a 7.9% DVB crosslinked polymethacrylic acid matrix resin was prepared.

A. A polymerization tube containing 6.00 parts (36 meq) 99.6% VBC, 0.20 part AIBN and 0.21 part 55% DVB in 10.2 parts n-heptane was heated for 1 hour each at 50°, 65°, and 80°C giving a rubbery polymer with a bead size of about 3–7 microns.

B. A mixture of 1.56 parts (9.5 meq) of poly VBC microbead resin 4A, 0.15 part AIBN, 1.28 parts (14.3 meq) methacrylic acid, 0.22 part 55% DVB and 1.22 parts dimethylformamide was held for 3 days at room temperature in a sealed tube and then heated for 1 hour each at 50°, 65° and 80°C yielding 3.74 parts of microbead-matrix resin.

C. The microbead-matrix resin 4B was crushed and 2.0 parts aminated by heating at 90°C for 1 hour twice with a solution of 7.0 parts 40% aqueous dimethylamine, 3.0 parts water and 8.0 parts dimethylsulfoxide to give 3.33 parts of wet aminated resin. a D. The resin 4C was pre-equilibrated and its thermally reversible capacity determined using a flow rate of 0.56 ml/min.

| Capacity: | 1st Cold | — 0.047 meq/ml |
|---|---|---|
| | 2nd Cold | — 0.048 meq/ml |

Hot — 0.075 meq/ml
Max. demineralization: 38%

EXAMPLE 5

Other Amphoteric Microbead-Matrix Resins

A. Table 1 lists properties of a series of typical amphoteric microbead-matrix resins prepared by the general procedures of Examples 1–4.

Table 1

Microbead-Matrix Resin Compositions

| Resin No. | Microbead-matrix Resin Compositions[1] | | WA/WB[3] | Demineralization Capacities, meq/ml[2] | | | |
|---|---|---|---|---|---|---|---|
| | Microbead | Matrix | | 1st Cold | 2nd Cold | Hot | Max.% |
| 1-1 | 2.5× PAA | 1.5× AmPVBC | 1.00 | 0.203 | 0.202 | 0.218 | 79% |
| 1-2 | 6.9× PAA | 1.5× AmPVBC | 1.00 | 0.162 | 0.157 | 0.175 | 75% |
| 1-3 | 1.0× PAA | 1.0× AmPVBC | 1.00 | 0.061 | 0.059 | 0.070 | 60% |
| 1-4 | 2.5× PAA | 1.5× AmPVBC[4] | 1.00 | 0.164 | 0.158 | 0.175 | 76% |
| 2-1 | 6.9× PMAA | 1.5× AmPVBC | 0.95 | 0.114 | 0.120 | 0.124 | 71% |
| 2-2 | 2.5× PMAA | 1.5× AmPVBC | 1.04 | 0.110 | 0.109 | 0.125 | 70% |
| 2-3 | 4.8× PMAA | 1.5× AmPVBC | 1.08 | 0.099 | 0.098 | 0.103 | 65% |
| 2-4 | 12.2× PMAA | 1.5× AmPVBC | 0.85 | 0.066 | 0.067 | 0.080 | 68% |
| 3-1 | 4.8× PMAA | 2.0× AmCMPS | 1.2 | 0.066 | 0.066 | 0.070 | 58% |
| 3-2 | 2.5× PAA | 4.0× AmCMPS | 1.2 | 0.077 | 0.077 | 0.091 | 64% |
| 3-3 | 4.8× PMAA | 4.0× AmCMPS | 1.2 | 0.072 | 0.071 | 0.098 | 63% |
| 4-1 | 2.0× AmPVBC | 7.9× PMAA | 1.51 | 0.083 | 0.087 | 0.096 | 54% |
| 4-2 | 6.0× AmPVBC | 8.1× PMAA | 1.96 | 0.018 | 0.020 | 0.024 | 24% |
| 4-3 | 2.0× AmPVBC | 8.1× PMAA | 2.00 | 0.047 | 0.048 | 0.070 | 38% |
| 4-4 | 2.0× AmPVBC | 8.1× PMAA | 1.00 | 0.079 | 0.078 | 0.088 | 60% |

[1]PAA — Polyacrylic acid
PMAA — Polymethacrylic acid
AmPVBC — Aminated polyvinylbenzyl chloride
AmCMPS — Aminated chloromethylated polystyrene
[2]Determined with a flow rate of about 0.5–0.6 ml/min
[3]Meq weak acid (COO⁻)/meq weak base (NR$_2$)
[4]Aminated with t-butylamine B. Table 2 gives the demineralization capacities of several microbead-matrix resins at a fast flow rate of about 1.0–1.5 bed volumes per minute.

Table 2

Fast Flow Demineralization Capacities

| Resin No. | Resin Composition | | WA/WB | 1st Cold | Hot | Max.% |
|---|---|---|---|---|---|---|
| | Microbead | Matrix | | | | |
| 1-1 | 2.5× PAA | 1.5× AmPVBC | 1.00 | 0.177 | 0.215 | 71% |
| 1-2 | 6.9× PAA | 1.5× AmPVBC | 1.00 | 0.138 | 0.179 | 63% |
| 2-1 | 6.9× PMAA | 1.5× AmPVBC | 0.95 | 0.076 | 0.102 | 41% |
| 2-2 | 2.5× PMAA | 1.5× AmPVBC | 1.04 | 0.110 | 0.136 | 56% |
| 4-1 | 2.0× AmPVBC | 7.9× PMAA | 1.51 | 0.061 | 0.089 | 33% |

EXAMPLE 6

Effect of Microbead Crosslinking

Tables 3 and 4 present data on several microbead-matrix resins prepared with a constant low crosslinking (1.5% DVB) of the PVBC matrix. Highest capacities are obtained with the lowest crosslinked microbead resin suggesting that the rate of diffusion into the more highly crosslinked weak acid region of the resin becomes very slow.

Table 3

PMAA — 1.5× AmPVBC Resins

| Resin No. | % DVB Microbead | Mole Ratio PMAA/PVBC | Maximum Demineralization | Thermal Rev. Capacity | |
|---|---|---|---|---|---|
| | | | | meq/ml | meq/g |
| 2-2 | 2.5 | 1.04 | 70% | 0.11 | 0.44 |
| 2-3 | 4.8 | 1.08 | 65% | 0.10 | 0.33 |
| 2-1 | 6.9 | 0.95 | 71% | 0.11 | 0.32 |
| 2-4 | 12.2 | 0.85 | 68% | 0.07 | 0.19 |

Table 4

PAA — AmPVBC Resins

| Resin No. | %DVB Microbead/Matrix | Mole Ratio PAA/PVBC | Maximum Demineralization | Thermal Rev. Capacity | |
|---|---|---|---|---|---|
| | | | | meq/ml | meq/g |
| 1-3 | 1.0/1.0 | 1.0 | 60% | 0.06 | 0.29 |
| 1-1 | 2.5/1.5 | 1.0 | 79% | 0.20 | 0.67 |
| 1-2 | 6.9/1.5 | 1.0 | 75% | 0.16 | 0.30 |

Several resins prepared without microbead crosslinking but with higher matrix resin DVB leaked polyacrylic acid during amination of the PVBC matrix resin. Note that the optimum degree of crosslinking is an intermediate value suggesting that network interpenetration and diffusion characteristics are counterbalancing variables. Also, it is probable that secondary "isoporous" crosslinking is introduced during amination of the PVBC matrix polymers by reaction of the partially aminated matrix with residual chloromethyl groups. Because of this secondary crosslinking, the weak acid/weak base mole ratios given in these tables are minimum values calculated on initial monomer ratios.

EXAMPLE 7

Effect of Weak Acid/Weak Base Ratio

In the series of resins using PVBC microbeads shown in Table 5, it is apparent that the weak acid/weak base ratio in the range of about 1.0–1.5 has little effect on demineralization capacity.

Table 5

AmPVBC/PMAA Resins

| Resin No. | Mole Ratio PMAA/PVBC | % DVB PVBC | % DVB PMAA | Maximum Demineralization | Thermal Rev. Capacity, meq/ml |
|---|---|---|---|---|---|
| 4–4 | 1.0 | 2.0 | 8.1 | 60% | 0.08 |
| 4–1 | 1.5 | 2.0 | 7.9 | 54% | 0.09 |
| 4–3 | 2.0 | 2.0 | 8.1 | 38% | 0.05 |

EXAMPLE 8

Chloromethylated Polystyrene Resins

Table 6 summarizes several resins made by embedding a polymethacrylic acid resin in a polystyrene matrix that is then chloromethylated and aminated. The capacities of these resins were not as high as similar resins made from polymethacrylic acid microbeads in a polyvinylbenzyl chloride matrix. However, the synthesis conditions were not examined in detail.

Table 6

PMAA/AmCMPS Resin

| Resin No. | Mole Ratio PMAA/PS | % DVB PMAA | % DVB PS | Maximum Demineralization | Thermal Rev. Capacity, meq/ml |
|---|---|---|---|---|---|
| 3–1 | 1.0 | 4.8 | 2.0 | 58% | 0.07 |
| 3–3 | 1.0 | 4.8 | 4.0 | 63% | 0.07 |
| 3–2 | 1.0 | 2.5 | 4.0 | 64% | 0.08 |

I claim:

1. A thermally reversible, heterogeneous, amphoteric ion exchange resin in particulate form consisting essentially of:
   A. Microbead particles of a weak acid cation or weak base anion exchange resin having about 0.5 –10 percent crosslinking and a particle size of about 0.1 –10 microns, and
   B. A matrix of a weak base anion or weak acid cation exchange resin, opposite in type to the microbead resin, and having about 0.5–10 percent crosslinking,
   said microbead resin A being incorporated in the matrix resin B to give a composite amphoteric resin having a particle size of about 0.074–4.00 millimeters and a ratio of about 0.5–2.0 meq weak base anion exchange capacity per meq weak acid cation exchange capacity.

2. The amphoteric microbead-matrix ion exchange resin of claim 1 wherein the weak acid cation exchange resin is a crosslinked polyacrylic or polymethacrylic acid.

3. The amphoteric microbead-matrix ion exchange resin of claim 1 wherein the weak acid cation exchange resin is crosslinked with divinylbenzene.

4. The amphoteric microbead-matrix ion exchange resin of claim 1 wherein the weak base anion exchange resin is an aminated vinylaromatic resin crosslinked with divinylbenzene.

5. The amphoteric microbead-matrix ion exahange resin of claim 1 wherein a microbead resin of polyacrylic or polymethacrylic acid crosslinked with about 0.5–10 percent divinylbenzene is incorporated in a matrix resin of an aminated styrene-divinylbenzene resin.

6. The amphoteric microbead-matrix ion exchange resin of claim 5 wherein the aminated styrene-divinylbenzene resin is a copolymer of vinylbenzyl chloride and divinylbenzene aminated with a primary or secondary amine.

7. The amphoteric microbead-matrix ion exchange resin of claim 5 wherein the aminated styrene-divinylbenzene resin is a chloromethylated styrene-divinylbenzene aminated with a primary or secondary amine.

8. The amphoteric microbead-matrix ion exchange resin of claim 5 wherein the aminated styrene-divinylbenzene is aminated with dimethylamine.

9. The amphoteric microbead-matrix ion exchange resin of claim 1 wherein a microbead of aminated sytrene-divinylbenzene resin is incorporated in a matrix resin of polyacrylic or polymethacrylic acid crosslinked with about 0.5–10 percent divinylbenzene.

10. The amphoteric microbead-matrix ion exchange resin of claim 5 wherein 2–5 micron weak acid microbead copolymer particles of polyacrylic acid crosslinked with about 2.5 percent divinylbenzene are embedded in a weak base matrix resin prepared by aminating a copolymer of polyvinylbenzyl chloride crosslinked with about 1.5 percent divinylbenzene with dimethylamine, said resin having a thermally reversible capacity of about 0.20 meq NaCl/ml resin 11. A process for preparing an amphoteric microbead-matrix resin of claim 1 which comprises:
   A. Preparing a crosslinked weak acid or weak base ion exchange resin in microbead form with an average particle size of about 0.1–10 microns and about 0.5–10 percent crosslinking;
   B. Suspending the weak acid or weak base microbead particles in a liquid mixture of monomers which can be converted to a crosslinked matrix polymer of opposite ion exchange type;
   C. Polymerizing the liquid monomer mixture to form a matrix resin having the microbead particle embedded therein; and
   D. Converting as necessary, the microbead-matrix resin into active ion exchange form with a particle size of about 0.074–4.00 mm.

12. The process of claim 11 wherein a polyacrylic acid microbead resin crosslinked with about 2.5 percent divinylbenzene is suspended in a mixture of vinylbenzyl chloride and about 1.5 percent divinylbenzene and the mixture is polymerized, broken as necessary into particles of about 40–200 mesh, and aminated with aqueous dimethylamine.

13. The process of claim 11 wherein a weak acid microbead resin is suspended in styrene containing about 0.5–10 percent divinylbenzene, the mixture is polymerized to form a matrix resin having the microbead particles embedded therein, and thereafter the matrix resin is converted into a weak base form by chloromethylation and amination with a secondary alkylamine.

14. The process of claim 11 wherein a polybenzyl chloride microbead resin crosslinked with about 0.5–10 percent divinylbenzene is embedded in a polymethacrylic acid matrix resin and thereafter converted into weak base form by amination with aqueous dimethylamine.

15. A process for treating aqueous solutions using the amphoteric microbead-matrix resin of claim 1 wherein the resin containing anions and cations absorbed from the aqueous solution is regenerated by contact with an aqueous solution at a higher temperature.

16. The process of claim 15 wherein the aqueous solution to be treated has a pH of about 6–8 and the resin is preconditioned to the pH of the aqueous solution.

17. The process of claim 15 wherein brackish water containing from about 500 to 5000 ppm of dissolved salts is treated at ambient temperature with the amphoteric microbead-matrix resin to give an eluant containing a reduced concentration of dissolved salts, and thereafter the resin is regenerated by treatment with brackish water preheated to above about 60°C.

18. The process of claim 15 wherein hard water is softened by removal of alkaline earth salts with the amphoteric microbead-matrix resin.

* * * * *